United States Patent [19]

Schwirian et al.

[11] Patent Number: 4,941,159
[45] Date of Patent: Jul. 10, 1990

[54] LOW NEUTRON FLUENCE NUCLEAR REACTOR INTERNALS

[75] Inventors: Richard E. Schwirian, Pleasant Hills; Vincent A. Perone, Murrysville, both of Pa.

[73] Assignee: Westinghouse Electric Corp., Pittsburgh, Pa.

[21] Appl. No.: 257,917

[22] Filed: Oct. 14, 1988

[51] Int. Cl.$^5$ .................. G21C 15/10; G21C 11/06
[52] U.S. Cl. .................... 376/458; 376/400; 376/904; 376/288; 376/287
[58] Field of Search .............. 376/458, 904, 287, 288, 376/302, 450, 399

[56] References Cited

U.S. PATENT DOCUMENTS

| | | | |
|---|---|---|---|
| 2,874,307 | 2/1959 | Wigner et al. | 376/287 |
| 2,929,768 | 3/1960 | Mahlmeister et al. | 376/458 |
| 2,986,533 | 5/1961 | Kurtz | 376/904 |
| 3,128,234 | 4/1964 | Cage, Jr. et al. | 376/458 |
| 3,159,550 | 12/1964 | Laming | 376/458 |
| 3,260,650 | 7/1966 | Kalk et al. | 376/458 |
| 3,682,774 | 8/1972 | Beyer | 376/458 |
| 3,708,393 | 1/1973 | Waymire et al. | 376/302 |
| 3,785,924 | 1/1974 | Notari | 376/400 |
| 3,868,302 | 2/1975 | Singleton | 376/458 |
| 3,893,886 | 7/1975 | Aubert et al. | 376/458 |
| 4,080,257 | 3/1978 | Machado et al. | 376/400 |
| 4,462,956 | 7/1984 | Boiron et al. | 376/287 |
| 4,560,531 | 12/1985 | Leroy | 376/302 |
| 4,576,785 | 3/1986 | Clements et al. | 376/287 |
| 4,701,299 | 10/1987 | Alibran et al. | 376/302 |
| 4,731,220 | 3/1988 | Kim, Jr. | 376/458 |
| 4,743,423 | 5/1988 | Turner et al. | 376/287 |
| 4,751,043 | 6/1988 | Freeman et al. | 376/400 |

FOREIGN PATENT DOCUMENTS

| | | |
|---|---|---|
| 0059130 | 9/1982 | European Pat. Off. . |
| 0108020 | 5/1984 | European Pat. Off. . |
| 1811631 | 7/1969 | Fed. Rep. of Germany . |
| 944500 | 12/1963 | United Kingdom . |

*Primary Examiner*—Harvey E. Behrend
*Attorney, Agent, or Firm*—Michael G. Panian

[57] ABSTRACT

A new design for nuclear reactor internals resulting in reduced fast neutron leakage to the reactor vessel. The first step of the two-stage process reflects high energy or fast neutrons back into the core, by placement of a reflector made of tungsten, stainless steel, or zirconium oxide in the baffle barrel region. The second stage involves reducing the energy of any fast neutrons that may pass through the reflector by the use of a neutron energy reducer, composed of an hydrogenous material such as titanium hydride, surrounding the core barrel in the areas of high neutron flux. In addition to protecting the reactor vessel wall and increasing the operating life of a nuclear reactor, the neutron economy in the core, and hence the operating efficiency of a nuclear power plant, are significantly increased.

16 Claims, 3 Drawing Sheets

PRIOR ART

FIG.I.

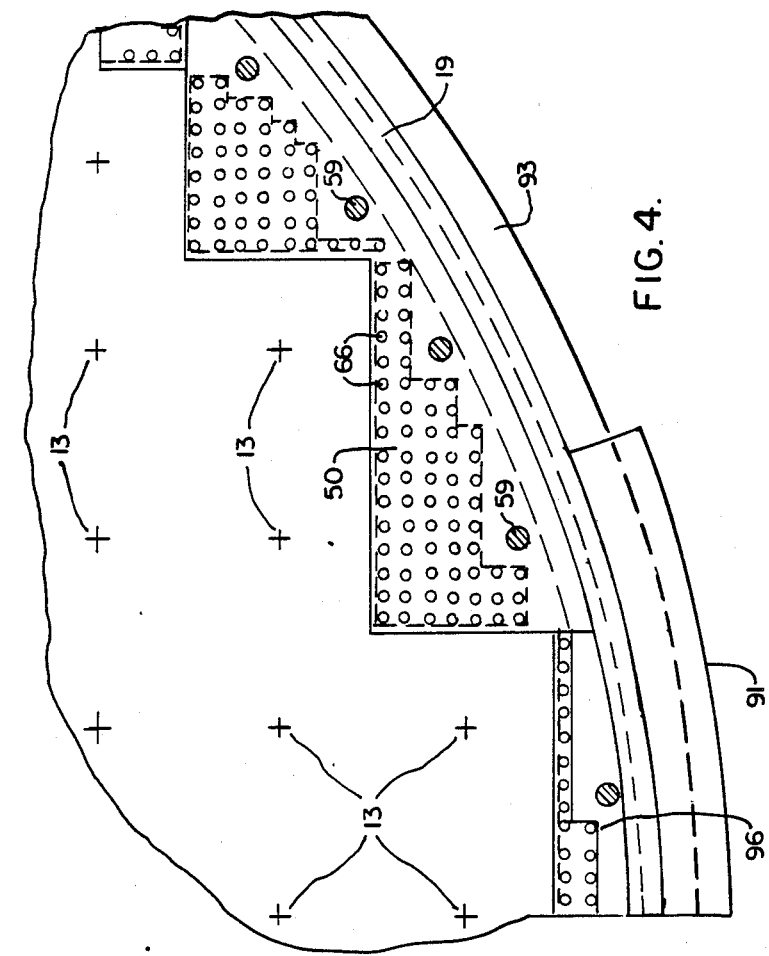
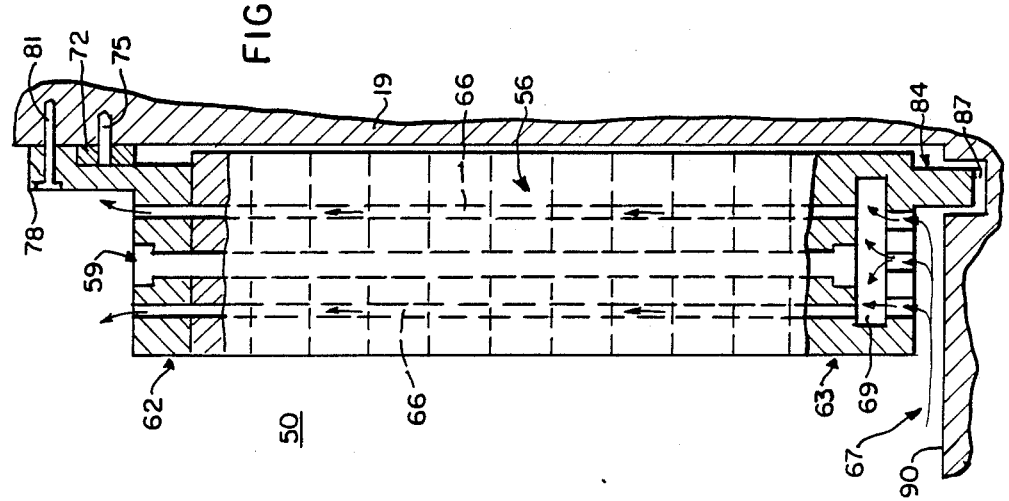

LOW NEUTRON FLUENCE NUCLEAR REACTOR INTERNALS

TECHNICAL FIELD

The invention relates to internals structures of a nuclear reactor vessel, and more particularly to a twostage, low neutron fluence reactor internals assembly.

BACKGROUND OF THE INVENTION

In a typical nuclear reactor power plant, nuclear fission is used to generate heat for the production of steam and electricity. In one such power plant, a pressurized water reactor for example, fissile material, generally in the form of uranium 238 enriched by uranium 235, is bombarded by neutrons to cause a fissionable reaction. The fission process produces additional neutrons which sustain the fissionable reaction within the reactor vessel. In such a vessel, nuclear fuel is arranged in a generally rectangular shaped reactor core within a generally cylindrical pressure vessel. Between the closely packed nuclear fuel, in the form of elongated fuel rods mounted within square shaped fuel assemblies, and the reactor vessel is an assembly commonly referred to as the reactor internals. The reactor internals typically comprise an upper core support plate, a lower core support plate and a core barrel. The core barrel is an elongated, generally cylindrically shaped structure radially situated between the reactor core and the cylindrical wall of the pressure vessel.

In the irregular space between the core and the core barrel, commonly referred to as the baffle-barrel region are structural components. (See FIG. 1.) Baffle plates which extend the length of the core are supported at several axially spaced radial locations by formers which, in turn, are attached to the core barrel. Radially outward beyond the core barrel is a thermal shield, a downcomer annulus, and then the reactor vessel. The baffle plates, formers, core barrel, and thermal shield are typically made of stainless steel; the downcomer annulus and most of the region between the baffle plates and the core barrel is mostly occupied by coolant.

To remove the heat generated within the core, the reactor coolant, typically borated water, circulates through the pressure vessel. The coolant enters the reactor vessel and flows downward within the downcomer annulus created by the core barrel and the reactor vessel to the lower region of the reactor vessel below the lower support plate. The coolant then flows upward through the core to remove heat generated by the fissioning of the nuclear fuel. The heated coolant then flows out of the pressure vessel to a heat exchanger, generally referred to as a steam generator, to generate steam within a secondary loop, which may then be used to drive a turbine generator to generate electrical power. The coolant then flows back into the reactor vessel to begin the process anew.

When fission first occurs, a number of the neutrons generated have a very high energy, greater than or equal to one million electron volts ($E \geq 1$ MeV), and are commonly referred to as fast neutrons. In order for the fission reactions to be sustained, these fast neutrons must be slowed down, a process also referred to as moderation or thermalization of fast neutrons. The coolant within the reactor vessel operates as a very good neutron moderator. Some of these neutrons may be absorbed by "poisons" within the vessel, either in the form of structural materials, fission products, control rods or the boron dissolved within the coolant In this manner, together with control rod insertion and removal, the rate of nuclear fission can be adequately controlled so that the nuclear power plant can be operated in an efficient and economical manner.

Nevertheless, some of the neutrons are not captured as part of the fission process and travel through the core to the core barrel and eventually to the reactor vessel itself. Since the continued operation of a nuclear reactor requires a steady source of neutron flux, the loss of neutrons in this manner may affect the efficiency of a nuclear power plant and the natural characteristics of the reactor vessel. Efforts have been undertaken in recent years to increase the operating efficiency of a nuclear reactor by reclaiming these neutrons. The means chosen for this effort has been to provide for a neutron reflector in the irregular area of the reactor between the core and the core barrel; that is, the area generally referred to as the baffle-barrel region. This has the added benefit of reducing radiation effects on the reactor vessel and peripheral components. Examples of this effort are U.S. Pat. No. 4,751,043 issued on June 14, 1988, entitled "Radial Neutron Reflector" and U.S. Pat. No. 4,849,162 issued on July 18, 1989, entitled "Modular Radial Neutron Reflector", both of which are assigned to the present assignee. By way of brief explanation only, these applications disclose a method of replacing most of the reactor coolant in the baffle barrel region with a neutron reflecting material, such as stainless steel or Zircaloy, to reflect these neutrons back towards the nuclear fuel within the reactor core. Typically, about 90% of this region is to be occupied by reflector material.

Although the use of reflector material in the region between the core and the core barrel can enhance the efficiency of the nuclear reactor by reflecting many of the otherwise lost neutrons back into the core to sustain the nuclear fissioning process, it is still possible for some fast neutrons to pass through the reflector and into the core barrel and reactor vessel. Typically this area is occupied by the coolant moderator medium and the various structural supports for the reactor lower internals. At the time when the lower internals were designed for their primary function of structural support, fast neutroninduced embrittlement of reactor vessel material was not as well understood as it presently is. Although the effect of fast neutron fluence, which is the flux integrated over time, on the reactor vessel is taken into account in developing its design, current lower internal designs have not been optimized to provide improved reactor vessel shielding as well as the structural functions. Current designs of lower internals do provide an amount of neutron flux reduction by the reflection or scattering of fast neutrons away from the vessel by the stainless steel components (baffle plates, formers, core barrel, and thermal shield) between the core and the vessel, and some slowing down of fast neutrons being accomplished by the water in the baffle-barrel region and in the downcomer annulus. If the energy of a significant number of fast neutrons passing through the reflector material can be reduced by interaction with an appropriate neutron shielding material, fewer neutrons will reach the reactor vessel with energies above the threshold which affects the vessel material. In this manner, the operating life of a nuclear reactor can be significantly increased.

DISCLOSURE OF THE INVENTION

It is an object of the present invention to provide a nuclear reactor internals design which will reduce the level of fast neutron flux to the reactor vessel.

It is another object of the present invention to provide a means for reducing fast neutron flux to the reactor vessel and also increase the level of neutrons available to sustain efficient power generation.

It is a further object of the present invention to provide a means for reducing fast neutron flux to the reactor vessel to thereby extend the efficient operating life of a nuclear power plant.

The above objects are attained by the present invention, according to which, briefly stated, a nuclear reactor pressure vessel having a core made up of relatively closely packed generally rectangular elongated components surrounded by a generally cylindrical core barrel to thereby define an irregular area therebetween such that some regions of the core are closer to the core barrel than others, means for reducing the fast neutron flux encountered by the reactor vessel is provided. The fast neutron flux reducer comprises a two-stage process: a neutron reflector situated in the irregular area between the core and the core barrel for reflecting fast neutrons back into the core, and a neutron energy reducer disposed around the periphery of the core barrel for reducing the energy of fast neutrons which pass through the reflector. The reflector material is constructed of stainless steel, tungsten and/or zirconium oxide. The neutron energy reducer is of a high density hydrogenous material such as titanium hydride.

BRIEF DESCRIPTION OF THE DRAWINGS

Various other objects, features and advantages of the invention will become more apparent to those skilled in the art by reading the following detailed description in conjunction with the drawings, which are shown by way of example only, wherein:

FIG. 3 is a partial cross-sectional view of a nuclear reactor pressure vessel having its baffle-barrel region replaced by a radial reflector of the present invention; and FIG. 4 is a partial plan view of the improved reactor internals of the present invention within a reactor vessel.

DESCRIPTION OF THE PREFERRED EMBODIMENTS

Figure 1:
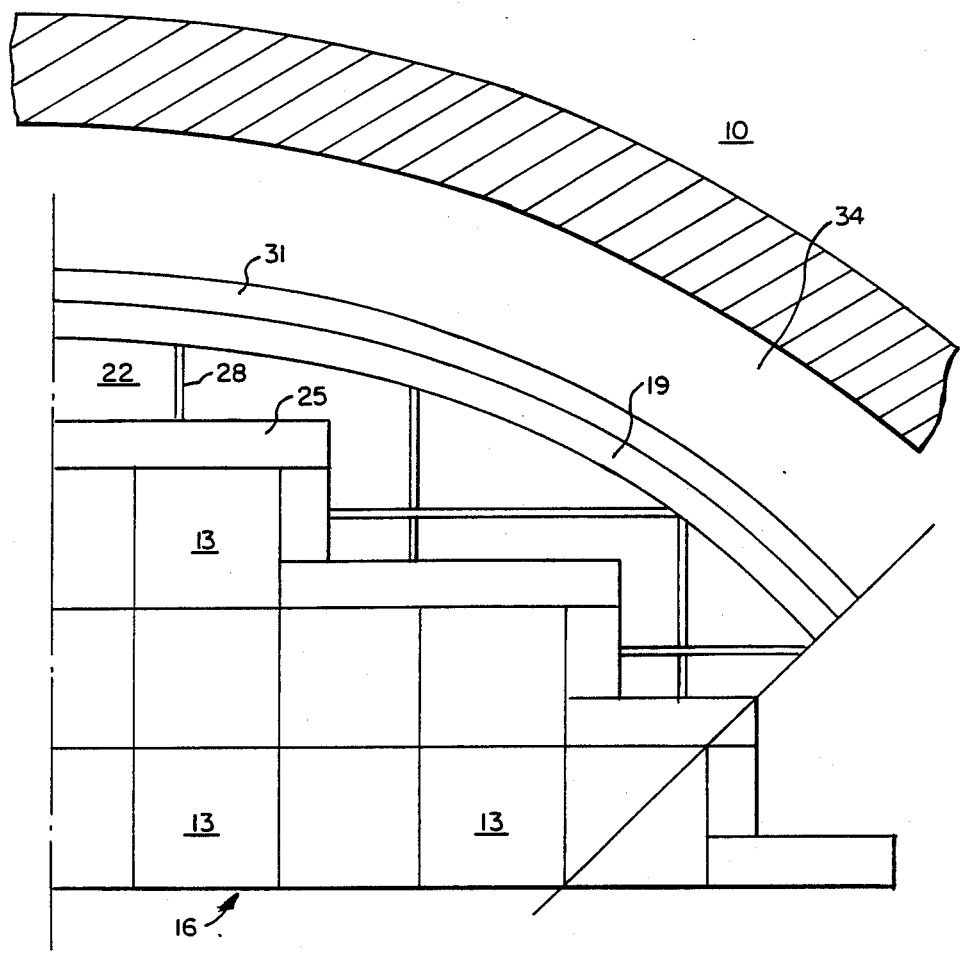
FIG. 1 is a partial plan view of a reactor internals region of a typical prior art nuclear power plant.

Referring now to the drawings in detail, the concept of the present invention will be more fully described. FIG. 1 shows a typical prior art arrangement of a nuclear reactor pressure vessel 10. Generally rectangular or square shaped fuel assemblies 13 are arranged in a relatively closely packed reactor core 16, which is surrounded by a core barrel 19. Between the generally cylindrical core barrel 19 and the reactor core 16 is an area commonly referred to as a baffle-barrel region 22. In this region are baffle plates 25 and formers 28 that provide a structural boundary for the fuel assemblies 13. They extend the length of the core perimeter and are attached to the core barrel 19. Surrounding the core barrel 19 is a thermal shield 31. In between the thermal shield 31 and the vessel wall 10 is the downcomer annulus 34. In this typical prior art arrangement, coolant, typically borated water, and the small amount of metal in the support structure of the baffle-barrel region fill this gap 22. In the design of the present invention, to effectively reduce fast neutron leakage to the reactor vessel and reflect such neutrons back into the core, the baffle-barrel region 22 is predominantly composed of metal.

Figure 2:
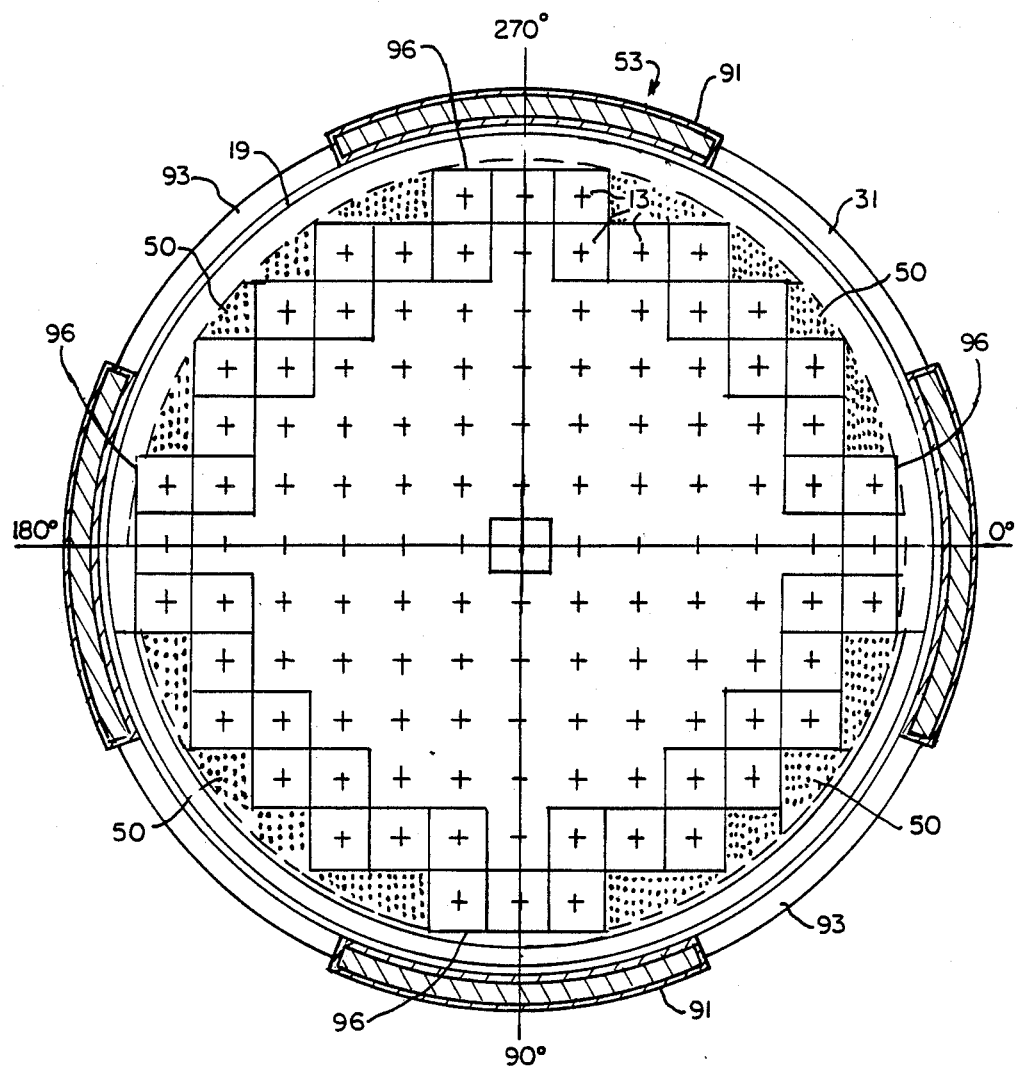
FIG. 2 is a plan view of a reactor internals of the present invention utilizing a reflector in the baffle-barrel region and neutron energy reducing material incorporated into the thermal shield in the downcomer annulus.

FIG. 2 shows a top plan view of the design of the present invention incorporating a radial reflector 50 in the baffle-barrel region, as well as a neutron energy, or fast flux, reducer 53 disposed around the periphery of the core barrel 19 in place of the thermal shield 31. Alternatively, the reducer 53 may be incorporated into the existing thermal shield 31. With the two stage process of neutron reflection followed by neutron energy reduction, fast neutron flux ($E \geq 1$ MeV) encountered by the reactor vessel wall can be significantly reduced.

FIG. 3 shows a cross-sectional view of a typical reflector of the present invention. The reflector 50 is preferably comprised of "uncanned" stacked plates 56 of appropriate reflector material. The metal used as a reflector 50 is preferably chosen from the group comprised of stainless steel, tungsten, zirconium oxide, or other suitable material having the desired neutron reflecting properties. A plurality of plates 56 of such suitable material are stacked one upon the other and secured together by means of a tie rod 59 which is bolted between the top plate 62 and the bottom plate 63 of the neutron reflector module 50. Flow holes 66 are provided in each of the plates 56, which vertically align to provide a flow path for coolant, generally designated by arrow 67. Also within the bottom plate 63, a plenum 69 is provided to provide for uniformity of flow upward through the reflector 50. Since the reflection of neutrons by the material generates heat within the reflector 50, adequate cooling is to be provided by the flow arrangement of the plenum 69 and the flow holes 66 within the individually stacked plates 56.

Vertical support for the reflector 50 is provided by a support block 72 and pin 75, which are permanently fixed to the core barrel 19. Additionally, a vertical member 78 of the top plate 62 is bolted 81 to the core barrel 19. In this manner the reflector 50 is supported in the manner of a cantilever beam. Lateral support for the reflector 50 is provided at the bottom by a guide pin 84, which may be an extension of the tie rod 59 or rods, which fits into an opening 87 in the lower core plate 90. The design of the reflector 50 and its association with the lower core plate 90, allows the guide pin 84 to thermally grow into the opening 87 as the reflector material is heated by its reflection of fast neutrons. Also, this design concept allows the reflector 50 to thermally grow as heat is generated, and to move axially relative to the core barrel 19. It may be desirable to use a structural can (not shown) of minimal wall thickness around the reflector for flow isolation, and to provide a continuous interface for fuel assemblies on the core side.

A reflector module 50 is easily installed and removed by such design. The reflector is removed by unbolting the bolt 81 on the top plate 62, lifting the module sufficiently for the guide pin 84 to clear the lower core plate 90, and then displacing the module laterally to clear the support block 72 before lifting vertically again. With the uncanned design, except for the tie rod 59 or rods, there are no structural members in the axial region of highest neutron flux, reasons for which will be more fully described hereinafter. FIG. 4 shows an enlarged plan view of one section of the reflector 50 of FIG. 2.

In the second stage of the low neutron flux nuclear reactor internals design, the neutron energy reducing, or thermalization, capacity of the prior art thermal shield 31 is improved by the utilization of a neutron energy reducer 53 secured to the core barrel 19. In this way the thermal shield 31 may be eliminated. In referring to FIG. 2, the fast neutron energy reducer 53 of the present invention is shown. In those regions of the reactor vessel 10 where the core 16 is closer to the core barrel 19 than others, due to the core 16 being constructed of generally rectangular or square shaped fuel assemblies 13 and the core barrel 19 being cylindrical, the neutron energy reducer 53 is segmented into alternate panels of canisters bearing hydrogenous material 91 and stainless steel 93, which preferably are attached to the outer periphery core barrel 19 in place of the thermal shield 31. The canisters of hydrogenous material 91 would preferably be positioned in azimuthal sectors generally corresponding to those regions of the core 16 having the highest neutron flux, commonly referred to as the "flats" regions 96 of the core. In the 335° to 25°, 245° to 295°, 155° to 205°, and 65° to 115° sectors spanned by the "flats" regions 96, the canisters containing high density hydrogenous material 91 are located.

Preferably, the hydrogenous material 91 is titanium hydride which has properties quite suitable for this purpose. Like borated water, titanium hydride is a very good neutron moderator, or is very good at thermalization of high energy or fast neutrons. Moreover, as an hydrogenous metal, titanium hydride is denser than water and therefore will encounter and thus slow down more fast energy neutrons than only borated water could. In this manner, any fast neutrons which may pass through the first stage reflector 50, will be slowed down or moderated by the second stage neutron energy reducer 53 to insure that the effects of fast neutrons on the reactor vessel 10 are significantly reduced.

To attach the titanium hydride material to the core barrel 19, titanium hydride plates are preferably secured together with a rod, much in the same manner as the reflector 50 is, and secured within a stainless steel canister. Since the effects of fast neutrons on stainless steel are well known, the use of stainless steel as a structural material for enclosing the titanium hydride is desirable. Consequently, it is preferable that the neutron energy reducer 53 be constructed as a stainless steel can, with the titanium hydride neutron flux reducer plates enclosed within. The shield cans can be secured or bolted to the outside of the core barrel 19 in a manner which is well known in the art. With this kind of design, the titanium hydride is readily removable and yet does not pose any foreign object concerns during normal reactor operation. Alternatively, titanium hydride panels may be secured directly to the core barrel 19, such as by welding.

As was mentioned previously, the azimuthal sectors containing the flats regions 96 of the core 16, the regions having the highest incidence of neutron flux, are to be especially protected. In these regions, preferably, the first stage neutron reflector 50 would be constructed of tungsten stacked plates 56. Since the design of the reflector 50 is an uncanned design, no structural materials other than the stacked plates 56 are necessary. Thus, it is not too important to have a material whose properties are completely known when it is subjected to fast neutrons. Only the tie rod 59 connecting the stacked plates 56 and the support block 72 and pin 75 need be made of such material. Therefore, the neutron reflector 50 adjacent to the flats regions 96 of the core 16 is preferably made of tungsten. Whereas its material properties when subjected to fast neutrons may not be as well known as that of stainless steel, tungsten provides a more efficient neutron reflector. Additionally, the second stage neutron energy, or fast flux, reducer 53 attached to the core barrel 19 adjacent the downcomer annulus 34 in these regions would be made of a more efficient neutron moderator. Hence, the use of titanium hydride in these regions for the neutron energy reducer 53 and stainless steel in all others is preferred. In this manner, the incidence of high energy neutron flux around the circumference of the reactor vessel 10 is more uniform. This is most desirable since the effects of any high energy neutrons which may eventually pass through the neutron flux reducer 53, will be more uniform over the entire circumferential surface of the reactor vessel 10.

Neutron transport calculations have been performed to confirm the fast neutron flux reduction potential of the novel two-stage design of the present invention. A transport model based on the geometric configuration of the preferred embodiment of the present invention as shown in FIG. 2 was calculated. The first stage reflector 50 is comprised of tungsten material adjacent to the "flats" regions 96 and stainless steel in the remaining portion of the prior art baffle-barrel zone 22. The second stage neutron energy reducer 53 shield canisters contain titanium hydride 91 in these regions, and stainless steel 93 elsewhere. The calculated fast flux reduction factor, which is defined as the ratio of the fast flux based on the existing design (see FIG. 1) to the fast flux based on the new two-stage design (FIG. 2), was found to be approximately 3.1 at the location of maximum flux. Therefore, the design of the present invention having a two stage process first reflects escaping fast neutrons away from the vessel and back into the core, in addition to protecting the vessel, this increases neutron economy within the core. Moreover, the second stage of reducing the energy of any fast neutrons that may pass through the reflector can help increase the efficient operating life of a nuclear power plant, by minimizing the effects of fast neutron flux upon the reactor vessel.

Although the second stage neutron energy reducer 53 has been described as being attached to the outer periphery of the core barrel 19, in some existing designs of reactor internals it may not be advantageous to do so. As an alternative, the canisters of the neutron energy reducer 53 may be attached to the thermal shield 31 within in the downcomer annulus 34, similar to its attachment to the core barrel 19 itself. Alternatively, so as not to greatly affect the flow of coolant through the downcomer annulus 34, cutouts may be provided in the thermal shield 31 in those azimuthal sectors adjacent the flats regions 96, so that the titanium hydride 91 canisters or plates may be placed therein, such as by welding. With this type of arrangement, since the thermal shield 31 is made of stainless steel, these type canisters would not have to be added thereto.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. In a nuclear reactor pressure vessel having a core made of generally rectangular components surrounded by a generally cylindrical core barrel to thereby define an irregular area therebetween such that some regions of the core are closer to the core barrel than others, an assembly for reducing the fast neutron flux encountered by the reactor vessel, said fast neutron flux reducer comprising:
   i. a neutron reflector comprised of a plurality of stacked plates situated in the irregular area between the core and the core barrel for reflecting fast neutrons back into the core, the neutron reflector located in the irregular area wherein said regions of the core are closer to the core barrel is made of material selected from the group consisting of tungsten and zirconium oxide, and the reflector located in the remainder of the irregular area is made of stainless steel; and
   ii. a neutron energy reducer disposed around the periphery of the core barrel for reducing the energy of any fast neutrons which pass through said neutron reflector.

2. The fast neutron flux reducer as recited in claim 1, wherein the neutron energy reducer is constructed of an hydrogenous material.

3. The fast neutron flux reducer as recited in claim 2, wherein the neutron energy reducer is constructed of titanium hydride.

4. The fast neutron flux reducer as recited in claim 1, wherein the neutron energy reducer is constructed of titanium hydride.

5. The fast neutron flux reducer as recited in claim 1, wherein said stacked plates have holes therein for the flow of coolant therethrough.

6. The fast neutron flux reducer as recited in claim 5, wherein said stacked plates are joined together by a tie rod secured between a top plate and a bottom plate of said stacked plates.

7. The fast neutron flux reducer as recited in claim 1, further comprising a thermal shield radially spaced around the core barrel and defining a downcomer annulus between the thermal shield and the reactor vessel, wherein the neutron energy reducer is disposed adjacent the thermal shield.

8. In a nuclear reactor pressure vessel having a core made of relatively closely packed generally rectangular components surrounded by a generally cylindrical core barrel to thereby define an irregular area therebetween such that some regions of the core are closer to the core barrel than others, an assembly for reducing the fast neutron flux encountered by the reactor vessel, said fast neutron flux reducer comprising:
   i. a neutron reflector situated in the irregular area between the core and the core barrel for reflecting fast neutrons back into said core, the neutron reflector material located in the irregular area wherein said regions of the core are closer to the core barrel is made of tungsten, whereas the neutron reflector material located in the remainder of the irregular material is made of stainless steel; and
   ii. a neutron energy reducer made of high density hydrogenous material disposed around the periphery of the core barrel for reducing the energy of any fast neutrons which pass through the neutron reflector.

9. The fast neutron flux reducer as recited in claim 8, wherein the neutron energy reducer is made of titanium hydride.

10. The fast neutron flux reducer as recited in claim 8, wherein the neutron reflector is further comprised of a plurality of stacked plates secured together, said stacked plates having holes therein for flow of a coolant therethrough.

11. The fast neutron flux reducer as recited in claim 8, further comprising a thermal shield radially spaced around the core barrel and defining a downcomer annulus between the thermal shield and the reactor vessel wherein the neutron energy reducer is attached to the thermal shield within the downcomer annulus.

12. The fast neutron flux reducer as recited in claim 11, wherein the thermal shield has a plurality of cutouts therein located adjacent to said regions of the core closer to the core barrel, and the neutron energy reducer is comprised of titanium hydride panels secured thereto.

13. In a nuclear reactor pressure vessel having a core made of relatively closely packed generally rectangular shaped components surrounded by a generally cylindrical core barrel to thereby define an irregular area therebetween such that some regions of the core are closer to the core barrel than other, an assembly for reducing the fast neutron flux encountered by the reactor vessel, said fast neutron flux reducer comprising:
   i. a neutron reflector situated in the irregular area between the core and the core barrel for reflecting fast neutrons back into said core, the neutron reflector material located in the irregular area wherein said regions of the core are closer to the core barrel being made of tungsten, whereas the neutron reflector material located in the remainder of the irregular area being made of stainless steel; and
   ii. a segmented neutron energy reducer supported by the core barrel for reducing the energy of any fast neutrons which pass through the neutron reflector, the neutron energy reducer material adjacent said regions of the core closer to the core barrel being made of titanium hydride, whereas the neutron energy reducer material adjacent said other regions being made of stainless steel.

14. The fast neutron flux reducer as recited in claim 13, wherein the neutron reflector is further comprised of a plurality of stacked plates secured together, said stacked plates having holes therein for flow of a coolant therethrough.

15. The fast neutron flux reducer as recited in claim 13, wherein the neutron energy reducer adjacent said regions of the core closer to the core barrel is further comprised of titanium hydride plates enclosed in a stainless steel canister secured to the core barrel.

16. The fast neutron flux reducer as recited in claim 13, further comprising a thermal shield radially spaced around the core barrel and defining a downcomer annulus between the thermal shield and the reactor vessel, wherein the neutron energy reducer is attached to the thermal shield adjacent the downcomer annulus.

* * * * *